(12) United States Patent
Otaki et al.

(10) Patent No.: US 11,902,854 B2
(45) Date of Patent: Feb. 13, 2024

(54) INFORMATION PROCESSING APPARATUS, INFORMATION PROCESSING METHOD, AND SYSTEM

(71) Applicant: TOYOTA JIDOSHA KABUSHIKI KAISHA, Toyota (JP)

(72) Inventors: Keisuke Otaki, Nagakute (JP); Ayano Okoso, Nagakute (JP); Tomoki Nishi, Nagakute (JP); Yoshinao Ishii, Nagakute (JP); Takayoshi Yoshimura, Nagakute (JP); Keiichiro Hayakawa, Nagakute (JP); Takahiro Shiga, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 387 days.

(21) Appl. No.: 17/203,983

(22) Filed: Mar. 17, 2021

(65) Prior Publication Data
US 2021/0306796 A1 Sep. 30, 2021

(30) Foreign Application Priority Data

Mar. 27, 2020 (JP) ................................ 2020-057638

(51) Int. Cl.
  *H04W 4/021* (2018.01)
  *G06N 5/04* (2023.01)
  *G06N 20/00* (2019.01)

(52) U.S. Cl.
  CPC .............. *H04W 4/022* (2013.01); *G06N 5/04* (2013.01); *G06N 20/00* (2019.01)

(58) Field of Classification Search
  CPC ......... H04W 4/022; G06N 5/04; G06N 20/00; G06Q 10/04; G06F 16/9537
  USPC ...................................................... 455/456.1
  See application file for complete search history.

(56) References Cited

U.S. PATENT DOCUMENTS

| 10,740,701 | B2* | 8/2020 | Zhang ..................... G06Q 50/30 |
| 2015/0032505 | A1* | 1/2015 | Kusukame ......... G06Q 30/0269 |
| | | | 705/7.31 |
| 2018/0039920 | A1* | 2/2018 | Zhang ..................... G06Q 10/04 |
| 2018/0232667 | A1* | 8/2018 | Maezawa ............... G06Q 10/04 |

FOREIGN PATENT DOCUMENTS

| JP | 2016-42275 A | 3/2016 |
| JP | 2016-42276 A | 3/2016 |
| WO | 2013/132778 A1 | 9/2013 |

* cited by examiner

*Primary Examiner* — Hirdepal Singh
(74) *Attorney, Agent, or Firm* — Sughrue Mion, PLLC

(57) ABSTRACT

A controller is provided that is configured to execute: predicting a distribution of first users in a predetermined area; predicting, based on the predicted distribution of the first users, a first point that is a point where a density of the first users exceeds a predetermined upper limit value in the predetermined area in the future; and transmitting, to a terminal of a second user who is a provider of a service, information about prompting provision of the service at a second point other than the first point in the predetermined area.

17 Claims, 7 Drawing Sheets

INFORMATION PROCESSING APPARATUS, INFORMATION PROCESSING METHOD, AND SYSTEM

CROSS REFERENCE TO THE RELATED APPLICATION

This application claims the benefit of Japanese Patent Application No. 2020-057638, filed on Mar. 27, 2020, which is hereby incorporated by reference herein in its entirety.

BACKGROUND

Technical Field

The present disclosure relates to an information processing apparatus, an information processing method, and a system.

Description of the Related Art

There has been known a technique in which information about the interests of each user is collected on a congested pathway or route, and services in which the users are interested are provided along the route, so that the users may stop by for the services, thereby alleviating traffic congestion (for example, refer to Patent Literature 1).

CITATION LIST

Patent Literature

Patent Literature 1: Japanese patent application laid-open publication No. 2016-042275

SUMMARY

An object of the present disclosure is to alleviate traffic congestion on a plurality of routes.

An aspect of the present disclosure is directed to an information processing apparatus including a controller configured to execute:
predicting a distribution of first users in a predetermined area;
predicting, based on the predicted distribution of the first users, a first point that is a point where a density of the first users exceeds a predetermined upper limit value in the predetermined area in the future; and
transmitting, to a terminal of a second user who is a provider of a service, information about prompting provision of the service at a second point other than the first point in the predetermined area.

Another aspect of the present disclosure is directed to an information processing method for causing a computer to execute:
predicting a distribution of first users in a predetermined area;
predicting, based on the predicted distribution of the first users, a first point that is a point where a density of the first users exceeds a predetermined upper limit value in the predetermined area in the future; and
transmitting, to a terminal of a second user who is a provider of a service, information about prompting provision of the service at a second point other than the first point in the predetermined area.

A further aspect of the present disclosure is directed to a system comprising:
a first terminal that is a terminal to which information about first users in a predetermined area is inputted;
a terminal of a second user who provides a service in the predetermined area; and
an information processing apparatus including a controller configured to execute:
predicting movement routes of the first users in the future based on information about the first users inputted to the first terminal;
predicting, based on the predicted movement routes of the first users, a first point that is a point where a density of the first users exceeds a predetermined upper limit value in the predetermined area in the future; and
transmitting, to the terminal of the second user, information about prompting provision of the service at a second point other than the first point in the predetermined area.

In addition, a still further aspect of the present disclosure is directed to a program for causing a computer to execute the information processing method described above, or a computer readable storage medium in which the program is stored in a non-transitory manner. Also, a yet further aspect of the present disclosure is directed to a method for causing a computer to execute the processing of the system described above, or a program for causing a computer to execute the method, or a computer readable storage medium with the program stored therein in a non-transitory manner.

According to the present disclosure, it is possible to alleviate traffic congestion on a plurality of routes.

DESCRIPTION OF THE EMBODIMENTS

Figure 1:
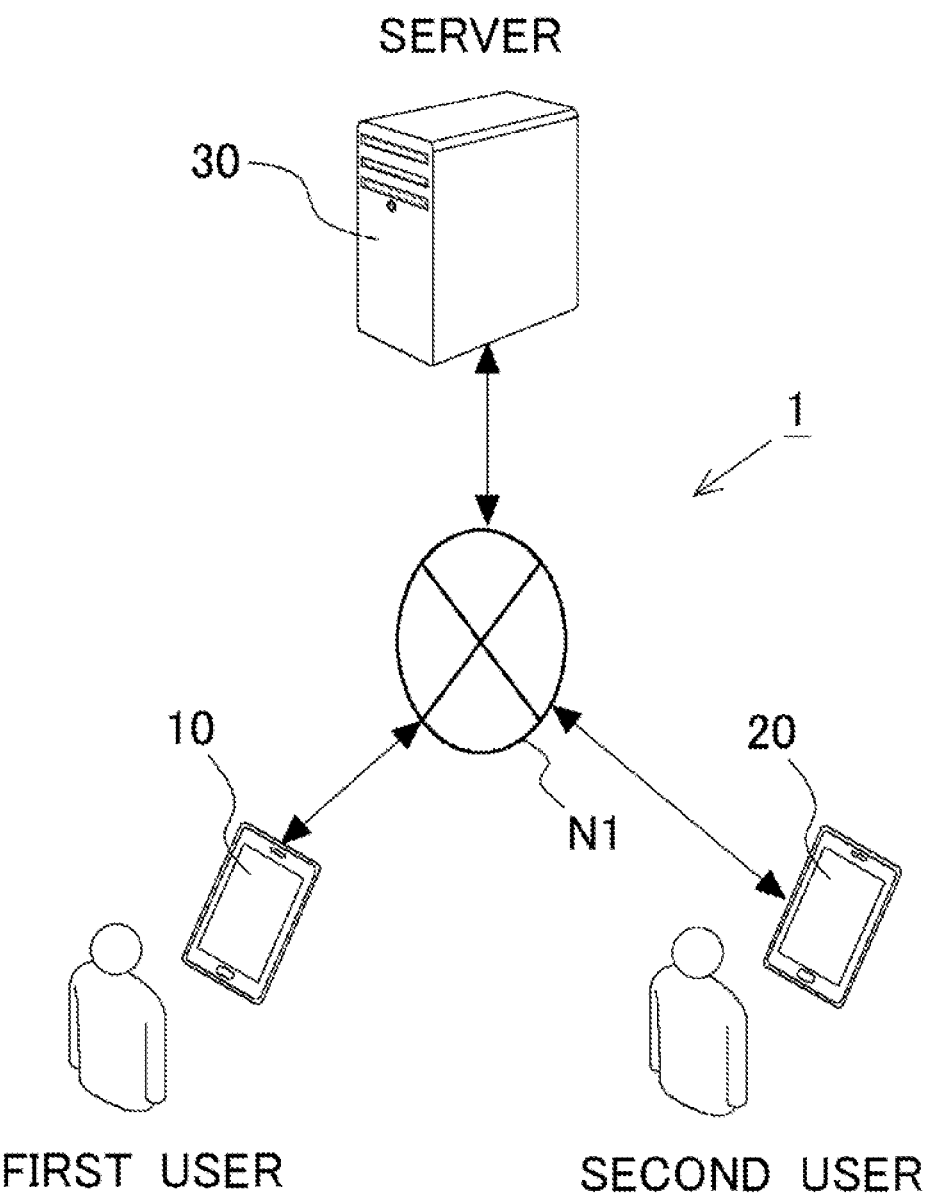
FIG. 1 is a diagram illustrating a schematic configuration of a system according to an embodiment.

A controller included in an information processing apparatus according to an embodiment predicts a distribution of first users in a predetermined area. The predetermined area is, for example, an area in which when an event or the like takes place, a crowd or congestion may occur by users who move to the event. For example, the predetermined area may be within a predetermined distance from an event site or venue. In addition, the predetermined area may be set as an area in which a crowd or congestion is alleviated by the information processing apparatus. Also, the predetermined area may be determined based on, for example, an administrative district. Moreover, the predetermined area may be inside the venue or site of an outdoor festival. In this case, if a plurality of stages is provided, a crowd or congestion at the time when the first users move between the stages may be reduced. Further, for example, the predetermined area may be inside a stadium. The prediction of the distribution of the first users is made, for example, by predicting the movement routes of the first users. For example, the distribution of the first users in the future can be predicted based on destinations of the first users or the movement routes of the first users in the past. For example, in cases where there was a similar event in the past, the distribution of the first users may be predicted on the assumption that the first users will move similarly when a similar event will be held in the future. At this time, the movement routes of the first users may be predicted in consideration of the characteristics of the first users. For example, assuming that first users with the same characteristics select the same movement route, the future movement routes of the first users may be predicted based on the past movement histories of the first users with the same characteristics. Further, the distribution of the first users may be predicted by obtaining a destination of each first user from, for example, a terminal carried by each first user, and by assuming that each first user is heading for the destination. The destination of each first user may be a destination of a route search using each user's terminal, or may be a place where an event contained in a message posted on an SNS is held. Further, position information of the first users at the current time point may be obtained, so that the distribution of the first users may be predicted based on the position information of the first users at the current time point.

In addition, the controller predicts, based on the predicted distribution of the first users, a first point that is a point where the density of the first users will exceed a predetermined upper limit value in the predetermined area in the future. The density of the first users may be, for example, the number of the first users per unit area. The first point may include a through point or place, a destination, or a movement route when the first users move or travel. The predetermined upper limit value may be, for example, an upper limit value of an allowable range. There may be a plurality of first points. The controller predicts, for example, the density of the first users at a predetermined time interval based on the predicted distribution of the first users, and determines whether or not the predicted density of the first users at the predetermined time interval exceeds the predetermined upper limit value.

Moreover, the controller transmits, to a terminal of a second user who is a provider of a service, information about prompting the provision of the service at a second point, which is other than the first point in the predetermined area. The second point is a point at which the density of the first users at the first point becomes equal to or less than the predetermined upper limit value, as the second user moves. The second user may be a user who provides a service at the first point, or may be a user who provides a service at a point other than the first point and the second point. Here, when the second user provides the service, the first users who want to receive the service gather. Therefore, the movement routes of the first users can be changed by changing the place or location where the second user provides the service. Then, by changing the position or location at which the service is provided in such a manner that the first users move from a point at which the density of the first users exceeds the predetermined upper limit value to another point at which the density of the first users is equal to or less than the predetermined upper limit value, it is possible to suppress the density of the first users from exceeding the predetermined upper limit value at each point in the predetermined area. Thus, a crowd or congestion in the predetermined area can be alleviated.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible.

First Embodiment

FIG. 1 is a view illustrating a schematic configuration of a system 1 according to an embodiment of the present disclosure. The system 1 includes, for example, a first user terminal 10, a second user terminal 20, and a server 30.

A first user in FIG. 1 is a user who operates the first user terminal 10, and a second user is a user who operates the second user terminal 20. The second user is also a user who provides a service to the first user. The service includes, for example, holding an event, providing food and drink, or the like. The event may be, for example, a performance, an academic conference, a meeting, a live event, an outdoor festival, a film screening, a gathering, an entertainment, or the like. There may be a plurality of first users and a plurality of second users, and there may be a plurality of first user terminals 10 and a plurality of second user terminals 20 according to the number of first users and the number of second users.

The first user terminal 10, the second user terminal 20 and the server 30 are connected to one another by means of a network N1. The network N1 is, for example, a worldwide public communication network such as the Internet, and a wide area network (WAN) or other communication networks may be adopted. In addition, the network N1 may include a telephone communication network such as a mobile phone network, and a wireless communication network such as WiFi and the like.

Figure 2:
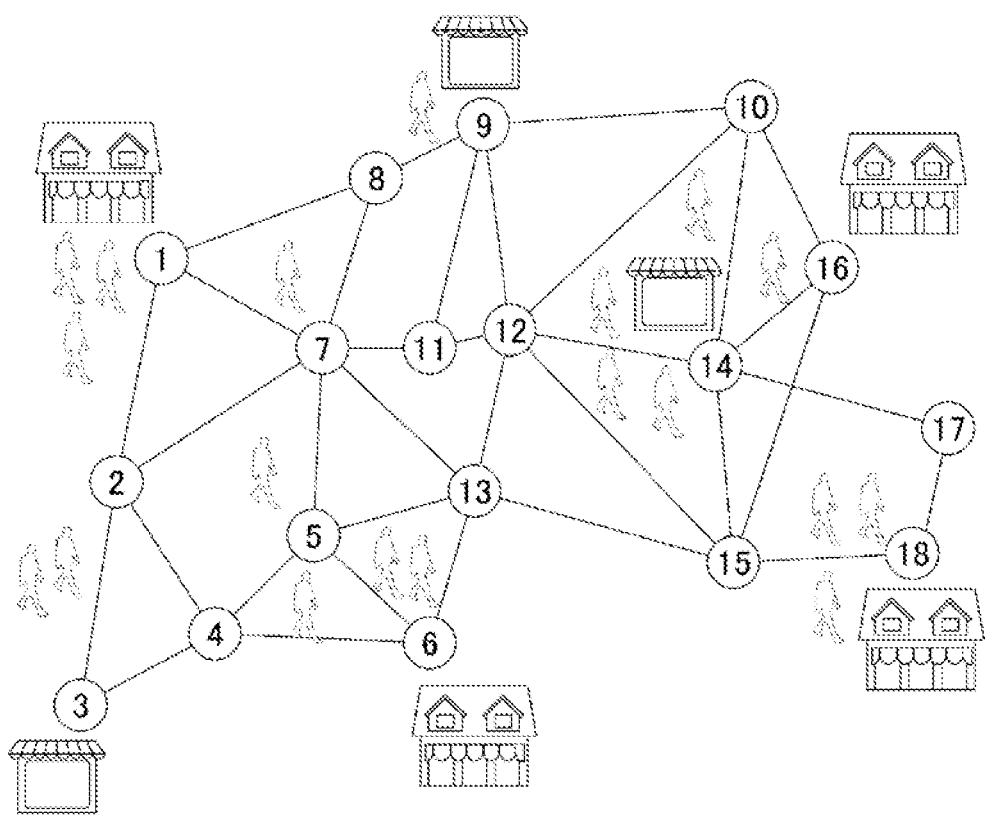
FIG. 2 is a view illustrating an example of a predetermined area.

The server 30 requests a second user to change the place of provision of a service. Further, the server 30 notifies a first user of a change in the place of provision of the service, thereby prompting to change the movement route of the first user or change the destination thereof. In this way, the reduction of congestion will be attained. For this reason, the server 30 predicts the distribution of first users in a predetermined area. FIG. 2 is a diagram illustrating an example of the predetermined area. The predetermined area illustrated in FIG. 2 includes numbered nodes and links connecting the nodes. The nodes correspond to destinations or through points (places) of the first users, and are also places where second users can provide services. The links correspond to the paths or routes along which the first users or the second users moves. Here, note that in the following description, a node numbered n is referred to as a node (n). In addition, a link connecting node (n) and node (m) is referred to as a link (n-m). Also, note that in FIG. 2, at each of nodes (1), (6), (16) and (18), for example, a structure or building where a performance takes place is located, and at each of nodes (3), (9) and (14), for example, a mobile store serving food and drink is located. The buildings in which the performances take place are located at the nodes that could be destinations for the first users. Moreover, the mobile stores are located at the nodes that the first users may pass through.

The server 30 obtains the information about the services of the second users, the information about the characteristics of the first users, the position information of the first users, and so on, and predicts the movement route of each first user based on these pieces of information. Here, note that such pieces of information are hereinafter also referred to as "area information". The information about the services of the second users includes information about the contents of the services, the positions or locations where the services are provided, the times when the services are provided, and so on. These pieces of information are obtained via second user terminals 20. The services of the second users include services that are provided at the destinations of the first users, and services that are provided at the through places of the first users. The information about the services provided at the destinations of the first users includes, for example, information about the opening time of a performance, the position where the performance takes place, the content of the performance, or the like. The information about the services provided at the through places of the first users includes, for example, information about the business hours of a mobile store, the location of the mobile store, or the content of a service provided by the mobile store.

In addition, the information about the characteristics of the first users is obtained, for example, based on inputs to their first user terminals 10, the actions or behaviors of the first users obtained from their first user terminals 10, or the like. The information about the characteristics of the first users includes information on the past movement histories of the first users (including, for example, destinations or through places), the results of questionnaires on movements made to the first users (including, for example, destinations or through places), performances that the first users want to participate in, the hobbies and preferences of the first users, the results when movement routes were recommended in the past (whether or not recommendations were accepted), the physical conditions of the first users (for example, whether or not the users are healthy, or the users are hungry, or the like), the gender and age of the first users, the gender and age of accompanying persons, the number of accompanying persons, or the like. The information about the characteristics of the first users may be information directly inputted to the first user terminals 10 by the first users, may be estimated from the contents inputted to the first user terminals 10 by the first users, may be estimated based on the services used by the first users in the past, or may be estimated based on the contents posted to an SNS. In addition, for example, information about the characteristics of the first users may be obtained from the profile fields of the SNS corresponding to the first users. For example, when a first user makes a post on the SNS, indicating that the first user is going to view a performance at the node (18), it may be estimated that the first user moves according to a performance time at the node (18). Moreover, in cases where a post indicating that a first user goes to the node (18) with friends has been posted on the SNS, the number of accompanying persons can be predicted. The current location of each first user is obtained from a location information sensor 17 provided in his or her first user terminal 10.

The server 30 predicts the movement route of each first user based on the area information. For example, the prediction of the movement route may be made based on the characteristic and destination of each first user. In addition, for example, the prediction of the movement route or path may be made by using machine learning. Then, the server 30 counts the numbers of first users in each node and each link at the predetermined time interval in the future, and calculates the densities of the first users in each node and each link. Then, in cases where it is predicted that there will occur a point or spot (first spot) where the density of the first users exceeds a predetermined upper limit value, information for prompting a second user to provide a service at a second point or spot other than the first spot is transmitted to a second user terminal 20. At this time, for example, the place of a performance or the place of a mobile store may be caused to move so that the densities of the first users in each node and each link at the predetermined time interval in the future do not exceed the predetermined upper limit value.

In FIG. 2, for example, a case will be described where it is predicted that the density of the first users exceeds the predetermined upper limit value in a link (12-14) at a predetermined time point. For example, it is assumed that even if hungry first users gather at two mobile stores (assumed to be restaurants) that are arranged at a node (9) and a node (14), respectively, these two mobile stores are able to meet the demand of the first users. On the other hand, it is also assumed that in cases where the mobile stores are located at the node (9) and the node (14), it is difficult to distribute the hungry first users, and the density of the first users in the link (12-14) exceeds the predetermined upper limit value. In this case, for example, the server 30 transmits an instruction to second user terminals 20 corresponding to the mobile stores so as to move the mobile store located at the node (14) to a node (15) and the mobile store located at the node (9) to a node (12). Further, the information on the positions of the mobile stores is notified to the first user terminals 10 carried by the hungry first users. At this time, coupons of the mobile stores or advertisements of the mobile stores may be transmitted, so that the first users can be made interested in the mobile stores. As a result, the first users may change the nodes and links through which they passes before reaching the destination where a performance is held, and hence, it is possible to suppress the density of the first users in the link (12-14) at the predetermined time point to a value equal to or less than the predetermined upper limit value. Thus, the congestion can be alleviated.

As described above, it is possible to alleviate the congestion by causing second users to change the points at which services are provided so as to prompt first users to change through places. Here, note that in the example of FIG. 2, the second users provide the services at the through places. The second users in this case are, for example, managers of mobile stores. On the other hand, even in cases where second users provide services at destinations, congestion can be alleviated in the same manner. The second users in this case are, for example, organizers of performances. For example, in cases where performances are held in a node (1) and a node (6), the densities of first users in each node and each link at the predetermined time interval in the future may be predicted, and the contents of the performances may be switched between the node (1) and the node (6) for the purpose of alleviating the congestion. In this way, by changing the positions in which the performances are held, it is possible to change the movement routes of the first users who want to participate in the respective performances, thus making it possible to alleviate the congestion.

(Hardware Configuration)

Figure 3:
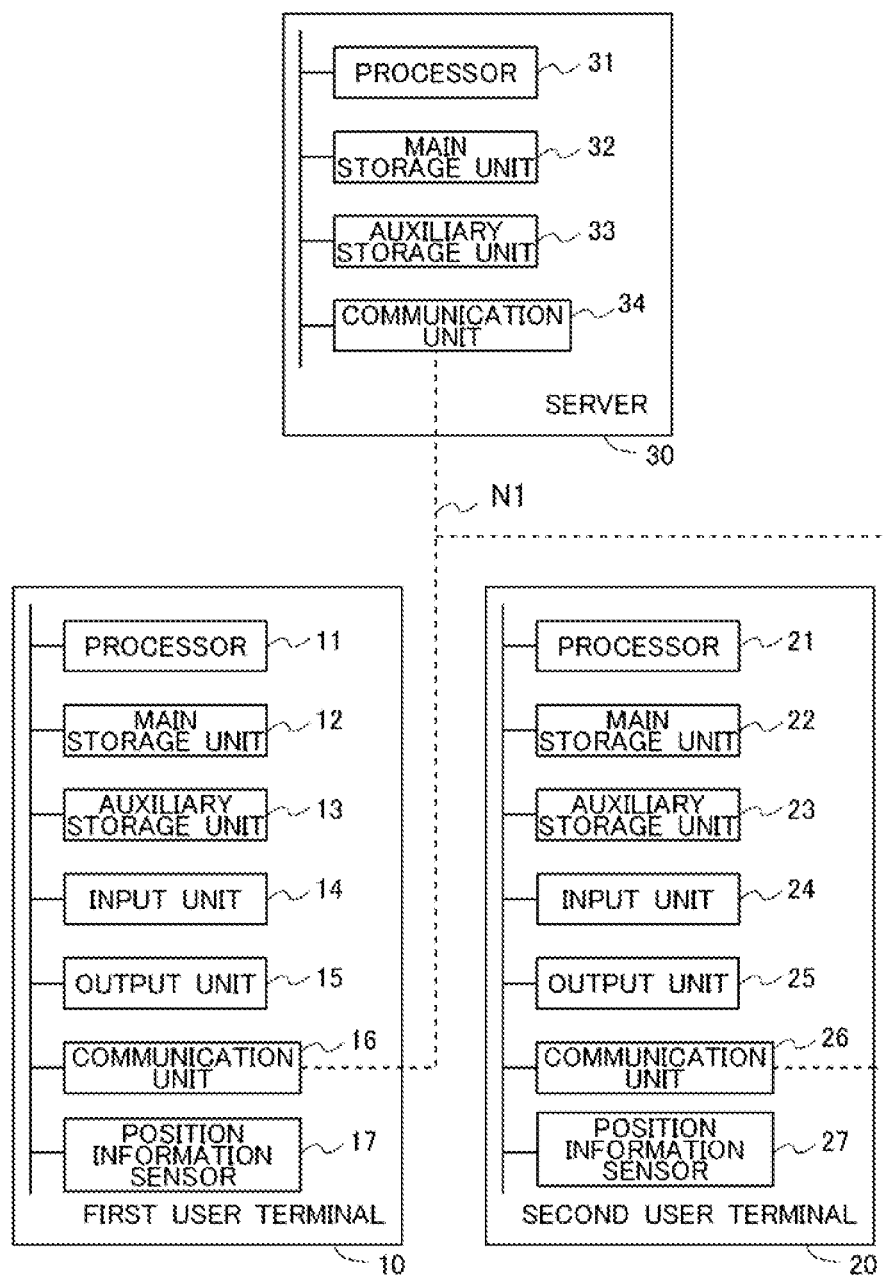
FIG. 3 is a block diagram schematically illustrating an example of a configuration of each of a first user terminal, a second user terminal, and a server, which together constitute the system according to the embodiment.

Next, the hardware configurations of the first user terminal 10, the second user terminal 20, and the server 30 will be described based on FIG. 3. FIG. 3 is a block diagram schematically illustrating an example of the configuration of each of the first user terminal 10, the second user terminal 20, and the server 30 which together constitute the system 1 according to the present embodiment.

The server 30 has a configuration of a general computer. The server 30 includes a processor 31, a main storage unit 32, an auxiliary storage unit 33, and a communication unit 34. These components are connected to one another by means of a bus. The server 30 is an example of an "information processing apparatus".

The processor 31 is a CPU (Central Processing Unit), a DSP (Digital Signal Processor), or the like. The processor 31 controls the server 30, and performs various information processing operations. The processor 31 is an example of a "controller". The main storage unit 32 is a random access memory (RAM), a read only memory (ROM), or the like. The auxiliary storage unit 33 is an erasable programmable ROM (EPROM), a hard disk drive (HDD), a removable medium, or the like. The auxiliary storage unit 33 stores an operating system (OS), various kinds of programs, various kinds of tables, and so on. The processor 31 loads programs stored in the auxiliary storage unit 33 into a work area of the main storage unit 32, and executes the programs, so that each component part or unit is controlled through the execution of the programs. As a result, the server 30 realizes functions that match predetermined purposes. The main storage unit 32 and the auxiliary storage unit 33 are computer readable recording media. Here, note that the server 30 may be a single computer, or a plurality of computers that cooperate with one another. Also, the information stored in the auxiliary storage unit 33 may be stored in the main storage unit 32. On the other hand, the information stored in the main storage unit 32 may be stored in the auxiliary storage unit 33.

The communication unit 34 is a means or unit for communicating with the first user terminal 10 and the second user terminal 20 via the network N1. The communication unit 34 is, for example, a local area network (LAN) interface board or a wireless communication circuit for wireless communication. The LAN interface board and the wireless communication circuit are connected to the network N1.

Here, note that a series of processing executed by the server 30 may be executed by hardware or may be executed by software. The hardware configuration of the server 30 is not limited to that illustrated in FIG. 3.

Then, the first user terminal 10 will be described. The first user terminal 10 is, for example, a smart phone, a mobile phone, a tablet terminal, a personal information terminal, a wearable computer (a smart watch or the like), a small computer such as a personal computer (PC), or the like. The first user terminal 10 includes a processor 11, a main storage unit 12, an auxiliary storage unit 13, an input unit 14, a display 15, a communication unit. 16, and a position information sensor 17. These components are connected to one another by means of a bus. The processor 11, the main storage unit 12, and the auxiliary storage unit 13 are the same as the processor 31, the main storage unit 32, and the auxiliary storage unit 33 of the server 30, and thus, the description thereof is omitted.

The input unit 14 is a means or unit that receives an input operation performed by a first user, and is, for example, a touch panel, a mouse, a keyboard, a push button, or the like. The display 15 is a means or unit that presents information to a user, and is, for example, a liquid crystal display (LCD), an electroluminescence (EL) panel, or the like. The input unit 14 and the display 15 may be configured as a single touch panel display. The communication unit 16 is a communication means or unit for connecting the first user terminal 10 to the network N1. The communication unit 26 is, for example, a circuit for communicating with other devices (e.g., the server 30 or the like) via the network N1 by making use of a wireless communication network such as a mobile communication service (e.g., a telephone communication network such as 5G (5th Generation), 4G (4th Generation), 3G (3rd Generation), or LTE (Long Term Evolution)), Wi-Fi (registered trademark), Bluetooth (registered trademark) or the like.

The position information sensor 17 obtains position information (e.g., latitude and longitude) of the first user terminal 10. The position information sensor 17 is, for example, a global positioning system (GPS) receiver unit, a wireless LAN communication unit, or the like.

Next, the second user terminal. 20 will be described. The second user terminal 20 is, for example, a smart phone, a mobile phone, a tablet terminal, a personal information terminal, a wearable computer (a smart watch or the like), a small computer such as a personal computer (PC), or the like. The second user terminal 20 includes a processor 21, a main storage unit 22, an auxiliary storage unit 23, an input unit 24, a display 25, a communication unit 26, and a position information sensor 27. These components are connected to one another by means of a bus. The processor 21, the main storage unit 22, the auxiliary storage unit 23, the input unit 24, the display 25, the communication unit 26, and the position information sensor 27 are the same as the processor 11, the main storage unit 12, the auxiliary storage unit 13, the input unit. 14, the display 15, the communication unit 16, and the position information sensor 17 of the first user terminal 10, and hence, the description thereof will be omitted.

(Functional Configuration: Server)

Figure 4:
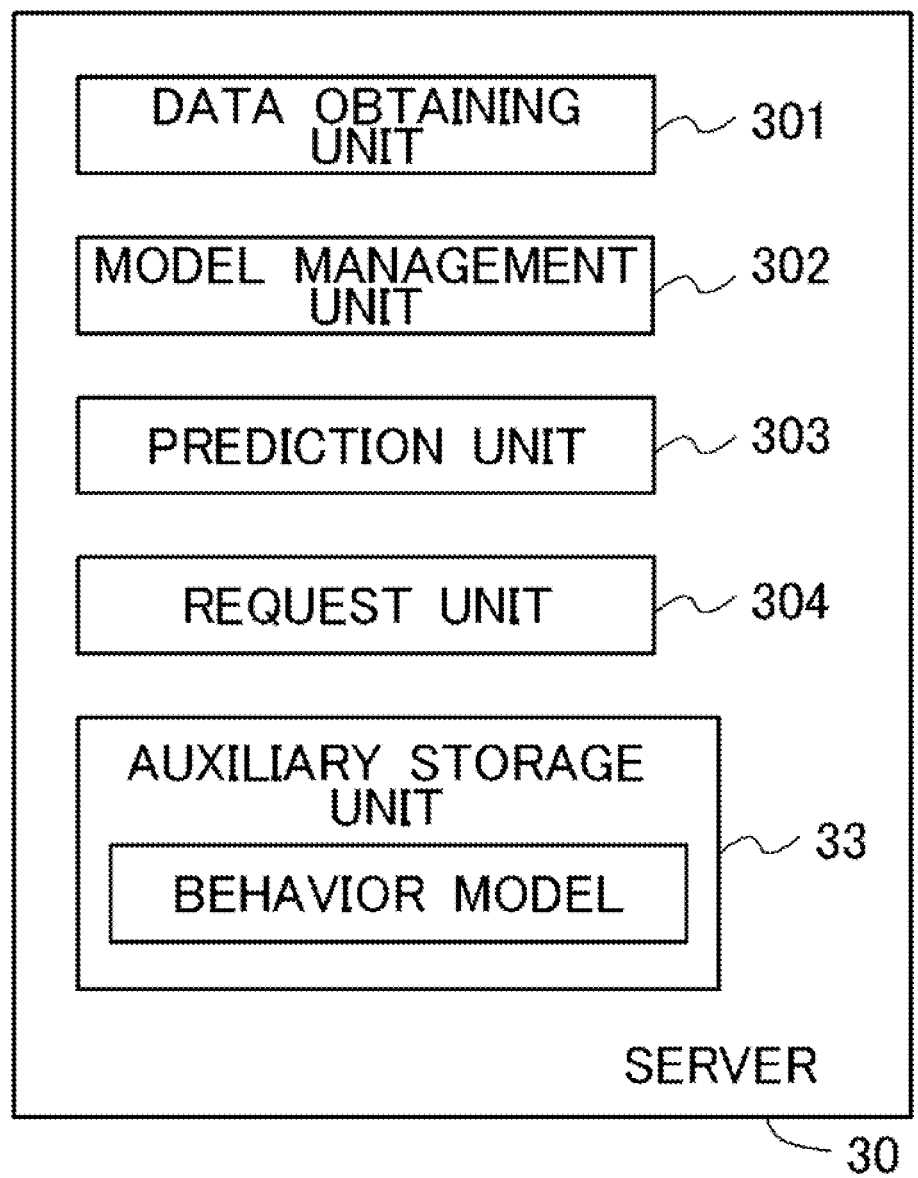
FIG. 4 is a diagram illustrating a functional configuration of the server.

Now, the function of the server 30 will be described. FIG. 4 is a diagram illustrating an example of the functional configuration of the server 30. The server 30 includes, as its functional components, a data obtaining unit 301, a model management unit 302, a prediction unit 303, and a request unit 304. The processor 31 of the server 30 executes the processing of each functional component by a computer program on the main storage unit 32. However, any of each functional component or a part of the processing thereof may be executed by a hardware circuit. In addition, the server 30 stores a model (hereinafter, a behavior model) representing a typical behavior of the first user in the predetermined area, predicts the position of the first user at each predetermined time in the future based on the information obtained from the first user terminal 10 and the second user terminal 20 and the behavior model, and moves the mobile store based on the position thus predicted.

The behavior model has been stored in the auxiliary storage unit 33. The behavior model is a model representing a typical behavior pattern (hereinafter, a predetermined behavior pattern) taken by the first user when the first user moves in the predetermined area. The behavior model is generated, for example, by performing machine learning based on the area information. The area information includes information on the past movement history of the first user, and this movement history can include, for example, a history of movement of the first user when the same event was held last time (e.g., last year). In addition, the area information includes information about the characteristic of the first user, and the information about the characteristic of the first user includes, for example, information about whether or not the first user likes new things, whether or not the first user takes regular action or behavior, or whether or not the first user likes shopping. These pieces of information may be obtained, for example, by having the first user answer a questionnaire in advance, or may be estimated from the action or behavior of the first user. For example, a first user, who often takes the long way around to visit a newly opened store, may be determined to be a lover of new things. Also, for example, a first user, who does not go to a famous store even when passing near that store, may be determined to take regular action. These are determined based on, for example, the movement history of the first user. Moreover, the area information includes information obtained in real time by a sensor or the like. This information is, for example, position information transmitted from the first user terminal 10 or information inputted to an application used in the first user terminal 10. Further, the area information may include, for example, information on the level or degree of hunger of the first user. The degree of hunger of the first user is, for example, an index indicating whether or not the first user wants to have a meal. The behavior model may represent such things as, for example, "a first user, who likes new things, likes shopping, and whose current position is a predetermined node, goes through a newly opened retail store", "a first user, who eats out a lot and is hungry, goes through a restaurant", "a first user, who takes regular behavior, moves on the same route regardless of the position of a mobile store", or "a first user, whose destination is a position where a predetermined performance is held, goes through a mobile store that sells products related to the predetermined performance". The behavior model may be automatically generated based on a result of sensing a first user.

If there is a first user having similar area information, it should be possible to predict the movement route of the first user from the current position based on the predetermined behavior pattern represented by the behavior model. That is, by applying the predetermined behavior pattern represented by the behavior model to each first user, it is possible to predict the position of the first user within the predetermined area at the predetermined time interval in the future. This makes it possible to predict the numbers of first users in each node and each link at the predetermined time interval in the future.

The data obtaining unit 301 obtains the area information. Also, the data obtaining unit 301 obtains information about the service from the second user terminal 20. As the information about the service, information such as the content of the service to be provided, whether or not the service can be moved, the time for providing the service, whether or not the time for providing the service can be changed, or the number of services that can be provided (e.g., including the number of products, the number of seats in a performance, the size of a space for providing the service, or the like) is received from the second user terminal 20. These pieces of information have been inputted to the second user terminal 20 in advance by the second user, for example.

In addition, the data obtaining unit 301 obtains information about the characteristic of the first user from the first user terminal 10. The data obtaining unit 301 obtains the characteristic of the first user based on, for example, information transmitted from a predetermined application (e.g., an application that provides transfer information, an application that provides route information, or an SNS application) installed in the first user terminal 10. In addition, in order to collect the characteristic of the first user, the data obtaining unit 301 may transmit to the first user terminal 10 a questionnaire (e.g., "Are you hungry now?") capable of obtaining the characteristic of the first user. Also, for example, the physical condition of the first user may be obtained based on a content (e.g., "I am hungry") posted by the first user on the SNS. Moreover, for example, when the first user performs a route search on the first user terminal 10, a destination inputted to the first user terminal 10 may be obtained as the destination of the first user. Further, the data obtaining unit 30 obtains, for example, position information sensed in the first user terminal 10. The above information may be transmitted from the first user terminal 10 to the server 30 at the predetermined time interval. The data obtaining unit 301 associates the time with the area information obtained periodically (e.g., every minute), and sequentially transmits the area information to the model management unit 302.

The model management unit 302 generates and updates the behavior model of the first user based on the area information obtained by the data obtaining unit 301. The area information transmitted from the data obtaining unit 301 is accumulated in the model management unit 302. For example, the model management unit 302 may update the behavior model every time the area information is received, or may update the behavior model every time the user arrives at the destination.

For example, the behavior model is updated by using the movement route obtained when the first user moves within the predetermined area. Here, note that the behavior model may be a machine learning model, or may be a model statistically representing the relation between the area information and the movement route of the first user. The behavior model may have any form as long as it represents the predetermined behavior pattern of the first user. In cases where the behavior model is a machine learning model, learning may be made by converting the area information into a feature quantity, and using the feature quantity as input data and the movement route as teacher data. In addition, the model management unit 302 can also perform transfer learning.

By using the stored behavior model, the prediction unit 303 predicts, from the current positions of first users, etc., the density of the first users at each point (which may be each node and each link) in the predetermined area at the predetermined time interval in the future. The density of the first users is, for example, the number of the first users per unit area for each node and each link. The areas of each node and each link can have been obtained in advance. When area information is received from a first user terminal 10 of a first user, the prediction unit 303 converts the area information into a feature quantity, and inputs the feature quantity to the behavior model, thereby predicting a future position of the first user at the predetermined time interval in the future from the current position thereof as a starting point. The predetermined time interval is set in advance as a period of time in which congestion can be alleviated. For example, the prediction unit 303 counts the numbers of first users in each node and each link within the predetermined area at the predetermined time interval in the future, and divides the numbers by the areas of each node and each link, thereby predicting the densities of first users in each node and each link.

The request unit 304 extracts a first point, which is a point where the density of first users at each point (which may be each node and each link) within the predetermined area at the predetermined time interval in the future exceeds a predetermined upper limit. This predetermined upper limit value may be, for example, the same or different for each node and each link. Then, in order to reduce the number of first users who pass through the first point thus extracted, a request for asking a second user to change the place of provision of a service (hereinafter, also referred to as a movement request) is generated and transmitted to a corresponding second user terminal 20. The movement request includes, for example, information about the request for movement, and information about the time and location of the movement. Using the behavior model, the request unit 304 selects a service to be moved and a position to be moved so that the densities of the first users in each node and each link within the predetermined area at the predetermined time interval in the future are equal to or less than the predetermined upper limit value, for example, in the case of assuming that the place of provision of the service of the second user has been changed. Whether or not the first users change their movement routes in response to the movement of the service may vary according to the characteristics of the first users. Therefore, it can be said that the request unit 304 selects the second user who is urged to provide the service at the second point based on the characteristics of the respective first users.

For example, in cases where many of the first users, who are predicted to pass through the first point, like new things and are in a hungry state, it is possible to change the flow of these first users by moving a mobile store that is newly opened and sells food. For example, if the area information at the time of assuming that the mobile store has moved is inputted to the behavior model after being converted into a feature quantity, it is possible to predict the density of the first users at each point in the predetermined area at the predetermined time interval in the future after the mobile store has moved.

Figure 5:
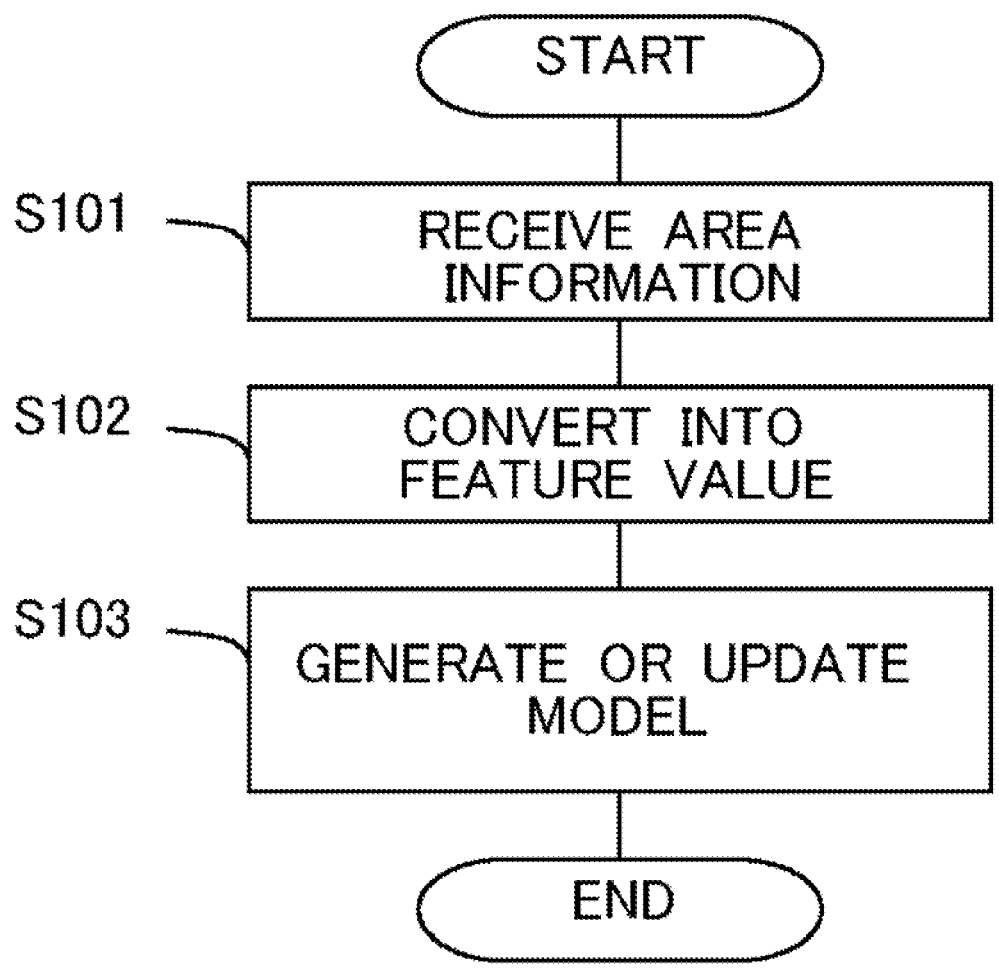
FIG. 5 is a flowchart of processing in which the server generates (or updates) a behavior model.

FIG. 5 is a flowchart of processing in which the server 30 generates (or updates) a behavior model. The routine illustrated in FIG. 5 is executed by the server 30 at predetermined calculation intervals.

First, in step S101, the data obtaining unit 301 receives area information from a first user terminal 10. In step S102, the model management unit 302 converts the area information into a feature quantity each time the area information is transmitted from the data obtaining unit 301 to the model management unit 302. Then, the model management unit 302 updates the behavior model by using the feature quantity as input data and a movement route as teacher data (step S103).

Figure 6:
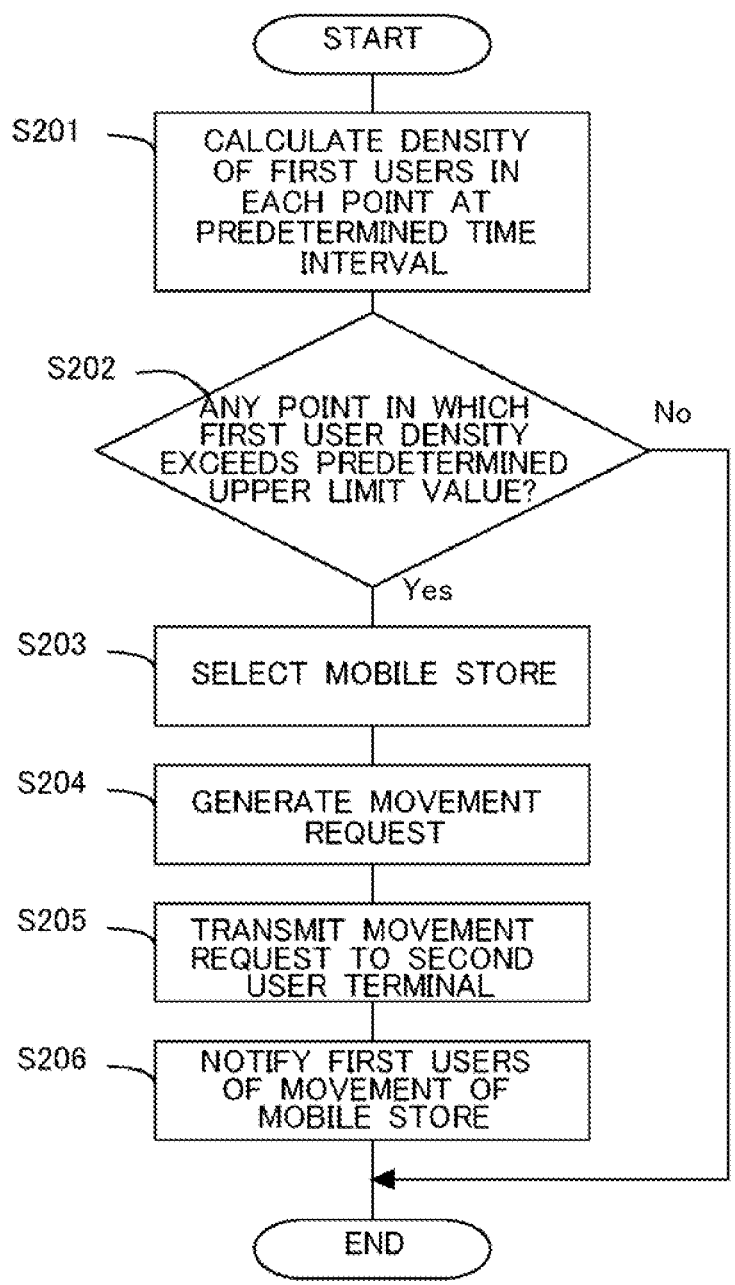
FIG. 6 is a flowchart of processing in which the server alleviates congestion in the predetermined area.

FIG. 6 is a flowchart of processing in which the server 30 alleviates congestion in the predetermined area. The processing or routine illustrated in FIG. 6 is executed by the server 30 at predetermined calculation intervals. Here, note that in the following description, it is assumed that the behavior model has been stored in the auxiliary storage unit 33.

In step S201, the prediction unit 303 calculates the density of the first users at each point in the predetermined area at the predetermined time interval in the future. The prediction unit 303 predicts the position of each first user at the predetermined time interval based on the behavior model and the area information obtained at the current time, and calculates the density of the first users at each point. When predicting the future position of a first user, the prediction unit 303 predicts, based on the position information at the current time transmitted from the first user terminal 10 of the first user, a movement route of the first user from the current position to a destination in association with time. Here, note that the first user does not necessarily move along the movement route predicted by the prediction unit 303, and hence, the accuracy of prediction of the future position of the first user can be increased by making use of the position information at the current time transmitted from the first user terminal 10. In addition, for example, the movement route can be predicted based on, for example, the physical condition (e.g., the degree of hunger) of the first user, so that the prediction accuracy of the movement route can be improved.

In step S202, the prediction unit 303 determines whether or not there is a point (first point) at which the density of the first users exceed the predetermined upper limit value. The prediction unit 303 compares the density of the first users at each point in the predetermined area at the predetermined time interval in the future with the predetermined upper limit value. In cases where an affirmative determination is made in step S202, the processing routine goes to step S203, whereas in cases where a negative determination is made, the present routine is ended.

In step S203, the request unit 304 selects a mobile store that can reduce the density of the first users at the first point to the predetermined upper limit value or less. Here, note that in cases where it is difficult to reduce the density of the first users to the predetermined upper limit value or less by the movement of any mobile store, a mobile store capable of reducing the density of the first users as much as possible may be selected. Further, in step S204, the request unit 304 generates a movement request to be transmitted to a second user terminal 20 that is associated with the selected mobile store. Then, in step S205, the request unit 304 transmits the movement request to the corresponding second user terminal 20.

In addition, in step S206, the request unit 304 transmits, to the first user terminal 10, information indicating that the mobile store has moved and information about the position to which the mobile store has moved. These pieces of information may be transmitted to the first users who are predicted to be present at the first point at the time when the density of the first users exceeds the predetermined upper limit value, or may be transmitted to all of the first users in the predetermined area.

As described above, the server 30 predicts a point where congestion will be caused by the first users in the future, and moves the second user so as to ease the congestion, whereby the alleviation of the congestion can be attained. Thus, the congestion can be avoided if the first users move based on the information from the server 30, without the first users having to look up the route by themselves. Then, the service to be moved is selected based on the characteristics of the first users, the probability that the first users changes their movement route in accordance with the movement of the service increases. Therefore, it is possible to alleviate the congestion in a more reliable manner. In addition, the distribution of the first users is predicted by using the data sensed at the current time in addition to the past data, thus making it possible to improve the prediction accuracy of a congested point or spot.

Here, note that in the above embodiment, the congestion is alleviated by moving the mobile store, but it is also possible to alleviate the congestion by moving, for example, the place of a performance to be held at a point that is the destination of the first users. For example, by changing the place or location where the performance is to be held, the movement route of the first users can be changed, so that the congestion at through points or places can be reduced until the first users arrive at the performance place. In addition, if it is possible to increase the number of first users who can be accommodated in the performance place by changing the place where the performance is to be held, the congestion in the performance place or venue can be reduced. Moving between performance venues involves swapping the locations of two performance venues. Moreover, in the present embodiment, the congestion may be reduced by changing the room in which the service is provided within the same building. For example, in cases where the density of the first users exceeds the predetermined upper limit value in a room that is a destination, the second user may be asked to change the room to another room with a larger capacity or another room having a larger space. The behavior model described above can also be applied to the case of changing the position or location as the destination of the users.

Second Embodiment

In the first embodiment, the object is to make the density of the first users equal to or less than the predetermined upper limit value, but in this second embodiment, the position or location where a service is provided is moved for the purpose of making the density of the first users equal to or greater than a predetermined lower limit value and equal to or less than the predetermined upper limit value. Here, the density of the first users at the first point can be reduced by moving the position where the service is provided, but when the density of the first users becomes too low, the first point may be in a deserted state. In this case, the first users feel that the event is not popular, so that the first user lacks excitement and the popularity of the event may decrease. On the other hand, by moving the position at which the service is provided so that the density of the first users becomes equal to or higher than the predetermined lower limit value, it is possible to suppress an excessive decrease in the density of the first users, thus making it possible to suppress a deserted atmosphere. Accordingly, the event can be made even more exciting. The predetermined lower limit value may be, for example, an allowable lower limit value of the density of the first users.

In this case, in step S203 of the routine illustrated in FIG. 6, the request unit 304 selects a mobile store with which the density of the first users at the first point are equal to or higher than the predetermined lower limit value and equal to or lower than the predetermined upper limit value. In this way, by maintaining a reasonable density of the first users, it is possible to make the event more exciting.

Third Embodiment

In the first embodiment, the congestion is reduced by moving a mobile store, but in this third embodiment, the congestion is further alleviated by shifting the time of provision of a service (e.g., the time of a performance) held in the point that is the destination of the first users. For example, in cases where it is difficult to make the density of the first users equal to or less than the predetermined upper limit value only by moving the mobile store, the time of provision of the service at the destination may be shifted, or the movement of the mobile store and the change in the time of provision of the service at the destination may be combined with each other, so that the density of the first users is made equal to or less than the predetermined upper limit value.

The data obtaining unit 3101 obtains from each second user terminal 20 the time of provision of a service that can be changed. For example, a second user inputs to a second user terminal 20 information about the content of a service, the time of provision of the service, the time at which the service can be provided in the case of assuming that the time of provision of the service is to be changed (hereinafter, also referred to as the changeable time), etc. These pieces of information are transmitted from the second user terminal 20 to the server 30.

In addition, the data obtaining unit 301 obtains, as area information, from a first user terminal 10, information about the content, time, position, etc., of a performance that the first user desires to view. For example, this information may be inputted to the first user terminal 10 by the first user, or may be estimated based on the content posted on the SNS by the first user. For example, in cases where there has been a posting to the effect that the user will go to a prescribed performance at a predetermined time, a point at which the prescribed performance will be held at the predetermined time is set as the destination of the first user.

The model management unit 302 generates and updates the behavior model of the first user based on the area information obtained by the data obtaining unit 301. The model management unit 302 accumulates the area information transmitted from the data obtaining unit 301.

By using the stored behavior model, the prediction unit 303 predicts, from the current positions of first users, the density of the first users at each point (which may be each node and each link) in the predetermined area at the predetermined time interval in the future. When area information is received from a first user terminal 10 of a first user, the prediction unit 303 converts the area information into a feature quantity, and inputs the feature quantity to the behavior model, thereby predicting a future position of the first user at the predetermined time interval in the future.

The request unit 304 extracts a first point or location, which is a point where the density of first users at each point (which may be each node and each link) within the predetermined area at the predetermined time interval in the future exceeds a predetermined upper limit. This predetermined upper limit value may be, for example, the same or different for each node and each link. Then, in order to reduce the number of first users who pass through the first point thus extracted, a request for asking a second user to change the time of provision of a service (hereinafter, also referred to as a change request) is generated and transmitted to a corresponding second user terminal 20. The change request includes, for example, information indicating a request to change the time of provision of a service, and information on the time of provision of a changed service. The request unit 304 selects a service of which the time of provision is to be changed and a time of provision of the service after changed so that the densities of the first users in each node and each link within the predetermined area at the predetermined time interval in the future are equal to or less than the predetermined upper limit value, for example, in the case of assuming that the time of provision of the service of the second user has been changed.

Figure 7:
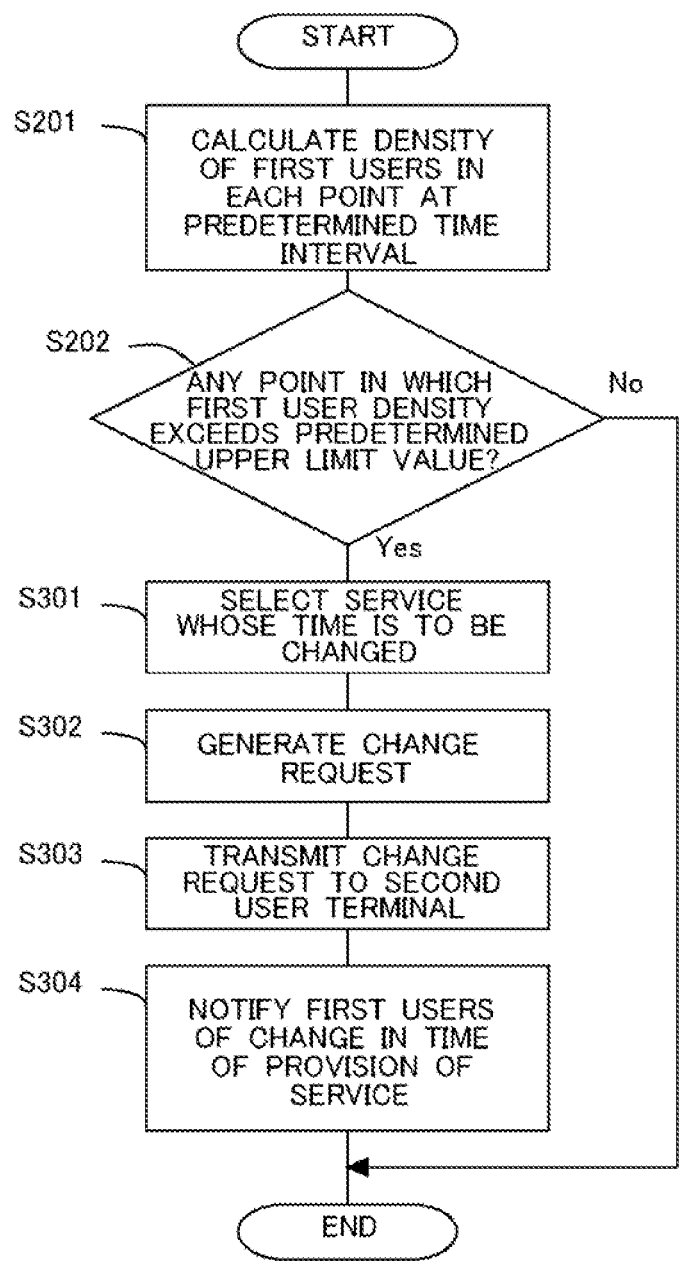
FIG. 7 is a flowchart of processing in which the server alleviates congestion in the predetermined area.

FIG. 7 is a flowchart of processing in which the server 30 alleviates congestion in the predetermined area. For example, the processing illustrated in FIG. 7 may be executed by the server 30 in cases where it is difficult to make the density of the first users equal to or less than the predetermined upper limit value only by the movement of the mobile store, or may be executed by the server 30 independently regardless of the movement of the mobile store. Here, note that the following description will be made on the assumption that the behavior model has already been stored in the auxiliary storage unit 33. For those steps in which the same processing as in the routine illustrated in FIG. 6 is carried out, the same reference numerals and characters are attached and the explanation thereof is omitted.

In the routine illustrated in FIG. 7, in cases where an affirmative determination is made in step S202, the processing goes to step S301. In step S301, the request unit 304 selects a second user corresponding to a service capable of reducing the number of first users at the first point or location. The request unit 304 causes the prediction unit 303 to predict the density of the first users at each point at the predetermined time interval in a state where the time of provision of each service has been changed, and selects a service and the time of provision of the service for which the density of the first users is equal to or less than the predetermined upper limit value.

In step S302, the request unit 304 generates a change request to be transmitted to a second user terminal 20 associated with the selected service. The change request is information for requesting the second user to change the time of provision of the service. Then, in step S303, the request unit 304 transmits the change request to the corresponding second user terminal 20.

In addition, in step S304, the request unit 304 transmits, to the first user terminal 10, information indicating that the time of provision of the service has been changed and information on the time of provision of the service after changed. This information may be transmitted to first users who are predicted to be present at the first point or location at the time when the density of the first users exceeds the predetermined upper limit value, or may be transmitted to all of the first users in the predetermined area.

As described above, the server 30 predicts a point or location that will be congested with the first users in the future, and changes the time of provision of a service so as to reduce the congestion, whereby the alleviation of the congestion can be attained. Here, note that in this third embodiment, the time of provision of a service at the destination of the first users is changed, but instead of this, the time of provision of a service(s) at a through point (e.g., the business hours of a mobile store(s)) may be changed.

Other Embodiments

The above-described embodiments are merely some examples, but the present disclosure can be implemented with appropriate modifications without departing from the spirit thereof.

The processing and means (devices, units, etc.) described in the present disclosure can be freely combined and implemented as long as no technical contradiction occurs.

In addition, the processing described as being performed by a single device or unit may be shared and performed by a plurality of devices or units. Alternatively, the processing described as being performed by different devices or units may be performed by a single device or unit. In a computer system, it is possible to flexibly change the hardware configuration (server configuration) that can achieve each function of the computer system.

In the above-described embodiments, the current location of first users is obtained by using the location information of the first user terminals 10, and congestion in the future is predicted based on the current location of the first users, but instead of this, future congestion may be predicted based on the number of first users detected by a sensor(s) such as a camera(s).

In the above-described embodiments, a second user is described as moving a mobile store in response to a movement request, but the second user can also refuse to move the mobile store. In this case, the server 30 may inquire of a second user terminal 20 whether or not the store can be moved, and may transmit the movement request to the second user terminal 20 only when a response indicating that the store can be moved is obtained from the second user terminal 20. On the other hand, when the response is that the store cannot be moved, then another second user capable of moving a mobile store may be sought.

The above-described embodiments are also applicable to, for example, a car sharing service. For example, in response to reservation information and inquiries from first users, a point or location of high demand may be predicted, and a second user may be notified so that more vehicles can be arranged at the point or location.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network.

The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read only memory (ROM), a random access memory (RAM), an EPROM, an EEPROM, a magnetic card, a flash memory, an optical card, or any type of medium suitable for storing electronic commands or instructions.

What is claimed is:

1. An information processing apparatus including a controller configured to execute:
   predicting a distribution of first users in a predetermined area;
   predicting, based on the predicted distribution of the first users, a first point that is a point where a density of the first users exceeds a predetermined upper limit value in the predetermined area in the future; and
   transmitting, to a terminal of a second user who is a provider of a service, information about prompting provision of the service at a second point other than the first point in the predetermined area,
   wherein when the second user has changed a point at which the service is provided from the first point to the second point, the controller selects the second point in such a manner that the density of the first users at the first point is equal to or less than the predetermined upper limit value.

2. The information processing apparatus according to claim 1, wherein when the second user has changed a point at which the service is provided from the first point to the second point, the controller selects the second point in such a manner that the density of the first users at the first point is equal to or greater than a predetermined lower limit value smaller than the predetermined upper limit value, and is also equal to or less than the predetermined upper limit value.

3. The information processing apparatus according to claim 1, wherein the controller predicts the distribution of the first users based on a detection value of each sensor that detects a current location of each of the first users.

4. The information processing apparatus according to claim 1, wherein
   the controller executes:
   obtaining a characteristic of each of the first users and a destination of each of the first users;
   predicting a movement route of each of the first users based on the characteristic of each of the first users and the destination of each of the first users; and
   predicting the distribution of the first users in the predetermined area based on the movement route of each of the first users.

5. The information processing apparatus according to claim 1, wherein the controller predicts the movement route of each of the first users based on area information that is information including information about the service of the second user, information about characteristics of the first users, and position information of the first users.

6. The information processing apparatus according to claim 5, wherein the controller learns a machine learning model using the area information as input data and the movement route of the first user as teacher data, and predicts the movement route of each of the first users by inputting the area information to be obtained from each of the first users to the learned machine learning model.

7. The information processing apparatus according to claim 4, wherein the controller obtains the information about the characteristics of the first users based on past movement histories of the first users.

8. The information processing apparatus according to claim 4, wherein the controller selects, based on the characteristic of each of the first users, the second user to which the information about prompting provision of the service at the second point is transmitted.

9. The information processing apparatus according to claim 4, wherein the characteristics of the first users include hobbies or preferences of the first users.

10. The information processing apparatus according to claim 4, wherein the characteristics of the first users include gender and age of the first users, gender of accompanying persons, age of accompanying persons, or the number of accompanying persons.

11. The information processing apparatus according to claim 1, wherein the controller transmits, to the terminal of the second user who provides the service at the first point, information about prompting to change a time for providing the service.

12. The information processing apparatus according to claim 1, wherein the controller transmits, to the terminal of the second user who provides the service at the first point, information about prompting to change a size of a space in which the service is provided based on the density of the first users.

13. The information processing apparatus according to claim 1, wherein the second user is a provider of a service at a destination of the first users.

14. The information processing apparatus according to claim 1, wherein the second user is a provider of a service at a through point of the first users.

15. The information processing apparatus according to claim 1, wherein the controller transmits, to terminals of the first users, information about prompting the first users to receive provision of the service at the second point.

16. An information processing method for causing a computer to execute:
predicting a distribution of first users in a predetermined area;
predicting, based on the predicted distribution of the first users, a first point that is a point where a density of the first users exceeds a predetermined upper limit value in the predetermined area in the future; and
transmitting, to a terminal of a second user who is a provider of a service, information about prompting provision of the service at a second point other than the first point in the predetermined area,
wherein when the second user has changed a point at which the service is provided from the first point to the second point, the computer selects the second point in such a manner that the density of the first users at the first point is equal to or less than the predetermined upper limit value.

17. A system comprising:
a terminal of each of first users to which information about the first users in a predetermined area is inputted;
a terminal of a second user who provides a service in the predetermined area; and
an information processing apparatus including a controller configured to execute:
predicting movement routes of the first users in the future based on information about the first users inputted to the terminals of the first users;
predicting, based on the predicted movement routes of the first users, a first point that is a point where a density of the first users exceeds a predetermined upper limit value in the predetermined area in the future; and
transmitting, to the terminal of the second user, information about prompting provision of the service at a second point other than the first point in the predetermined area,
wherein when the second user has changed a point at which the service is provided from the first point to the second point, the controller selects the second point in such a manner that the density of the first users at the first point is equal to or less than the predetermined upper limit value.

* * * * *